US008926735B1

(12) United States Patent
Xie et al.

(10) Patent No.: US 8,926,735 B1
(45) Date of Patent: Jan. 6, 2015

(54) SEPARATION OF GASES USING ZEOLITE SSZ-45

(71) Applicants: Dan Xie, Richmond, CA (US); Stacey Ian Zones, San Francisco, CA (US); Hua-Min Huang, Hercules, CA (US); Joshua Allen Thompson, Larkspur, CA (US); Howard Steven Lacheen, Richmond, CA (US); Cedrick Mahieux, Vallejo, CA (US)

(72) Inventors: Dan Xie, Richmond, CA (US); Stacey Ian Zones, San Francisco, CA (US); Hua-Min Huang, Hercules, CA (US); Joshua Allen Thompson, Larkspur, CA (US); Howard Steven Lacheen, Richmond, CA (US); Cedrick Mahieux, Vallejo, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/169,028

(22) Filed: Jan. 30, 2014

(51) Int. Cl.
*B01D 53/02* (2006.01)
*B01D 53/04* (2006.01)

(52) U.S. Cl.
CPC ................................. *B01D 53/04* (2013.01)
USPC ............................................ 95/139; 95/106

(58) Field of Classification Search
USPC .................................................. 95/106, 139
See application file for complete search history.

(56) References Cited

U.S. PATENT DOCUMENTS

| | | | |
|---|---|---|---|
| 6,033,643 A | 3/2000 | Yuen et al. | |
| 7,138,007 B1 | 11/2006 | Zones et al. | |
| 2003/0069449 A1 | 4/2003 | Zones et al. | |
| 2005/0166581 A1* | 8/2005 | Davis et al. | 60/295 |
| 2005/0230305 A1 | 10/2005 | Kulkarni et al. | |
| 2007/0286800 A1 | 12/2007 | Zones et al. | |
| 2008/0159936 A1* | 7/2008 | Zones et al. | 423/213.5 |
| 2009/0301933 A1* | 12/2009 | Miller et al. | 208/64 |
| 2014/0157986 A1* | 6/2014 | Ravikovitch et al. | 95/96 |

OTHER PUBLICATIONS

PCT International Search Report, PCT/US2014/049808, mailed Sep. 23, 2014.
S. Himeno, T. Tomita, K. Suzuki and S. Yoshida "Characterization and selectivity for methane and carbon dioxide adsorption on the all-silica DD3R zeolite" Micropor. Mesopor. Mater. 2007, 98, 62-69.
J. Van Den Bergh, W. Zhu, J. Gascon, J.A. Moulijn and F. Kapteijn "Separation and permeation characteristics of a DD3R zeolite membrane" J. Membr. Sci. 2008, 316, 35-45.
T.D. Pham, R. Xiong, S.I. Sandler and R.F. Lobo "Experimental and computational studies on the adsorption of CO2 and N2 on pure silica zeolites" Micropor. Mesopor. Mater. 2014, 185, 157-166.

* cited by examiner

*Primary Examiner* — Christopher P Jones
(74) *Attorney, Agent, or Firm* — Terrence Flaherty

(57) ABSTRACT

This disclosure relates generally to the selective separation of carbon dioxide ($CO_2$) from multi-component gas streams containing $CO_2$ utilizing zeolite SSZ-45 as an adsorbent.

6 Claims, 1 Drawing Sheet

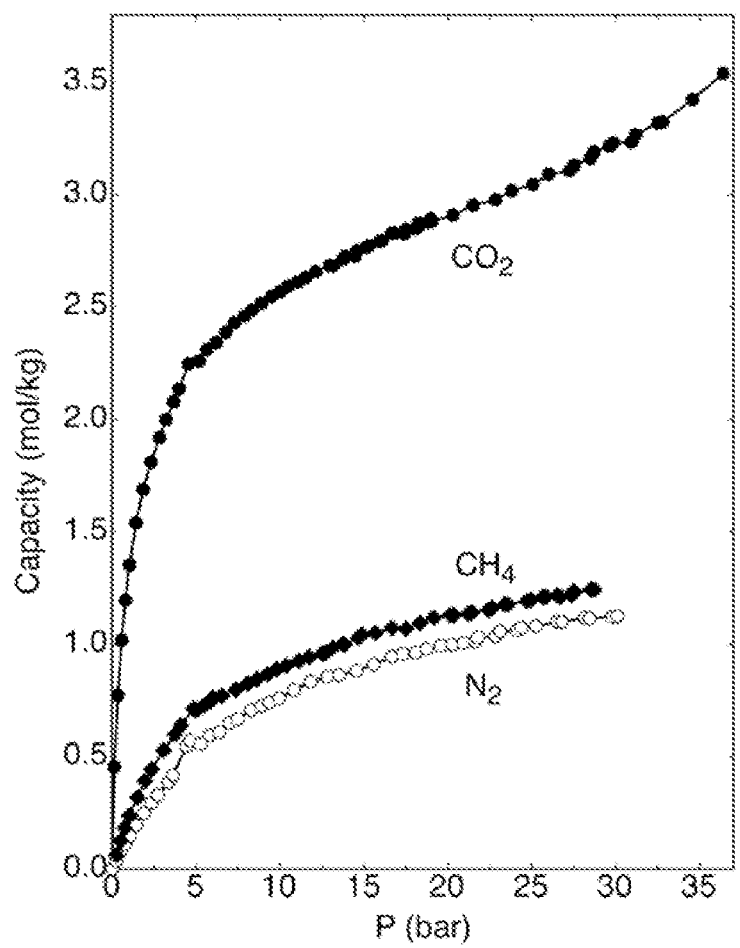

SEPARATION OF GASES USING ZEOLITE SSZ-45

TECHNICAL FIELD

This disclosure relates generally to the selective separation of carbon dioxide ($CO_2$) from multi-component gas streams containing $CO_2$ utilizing zeolite SSZ-45 as an adsorbent.

BACKGROUND

Zeolitic materials, both natural and synthetic, have been demonstrated in the past to have utility as adsorbent materials and to have catalytic properties for various types of hydrocarbon conversion reactions. Certain zeolitic materials are ordered, porous crystalline metallosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Separation of small molecules such as carbon dioxide ($CO_2$) and nitrogen ($N_2$) or carbon dioxide ($CO_2$) and methane ($CH_4$) are important for many industrial processes. Since the dimensions of these small molecules are similar and the conditions for their separation can be quite demanding, the commercial development of suitable zeolitic materials has been a significant challenge.

There remains a need for new zeolites that can provide improved $CO_2$ selectivity in gas separations.

SUMMARY

In one aspect, there is provided a process for selectively separating carbon dioxide ($CO_2$) from a multi-component gas feedstream comprising $CO_2$, the process comprising: (a) contacting the feedstream with an adsorbent comprising zeolite SSZ-45; and
(b) adsorbing at least a portion of the $CO_2$ in the adsorbent, thereby producing a $CO_2$-lean product stream, wherein the $CO_2$-lean product stream has a lower concentration of $CO_2$ by vol. % than the feedstream.

In another aspect, there is provided a process for selectively separating carbon dioxide ($CO_2$) from a multi-component gas feedstream comprising $CO_2$, the process comprising: (a) contacting the feedstream with an adsorbent comprising zeolite SSZ-45 at a first pressure and first temperature; (b) adsorbing at least a portion of the $CO_2$ in the adsorbent, thereby producing a $CO_2$-lean product stream, wherein the $CO_2$-lean product stream has a lower concentration of $CO_2$ by vol. % than the feedstream; and (c) desorbing at least a portion of the $CO_2$ in the adsorbent at a second pressure and second temperature, thereby producing a $CO_2$-rich product stream, wherein the $CO_2$-rich product stream has a higher concentration of $CO_2$ by vol. % than the feedstream.

In yet another aspect, there is provided a process for selectively separating carbon dioxide ($CO_2$) from a multi-component gas feedstream comprising $CO_2$, the process comprising: (a) contacting a first side of a membrane comprised of zeolite SSZ-45 with the feedstream at a first pressure and first temperature; (b) retrieving a first permeate stream from a second side of the membrane at a second pressure and second temperature, wherein the first permeate stream consists of components that selectively permeate through the membrane and the first permeate stream has a higher concentration of $CO_2$ by vol. % than the feedstream; and (c) retrieving a first retentate stream, wherein the retentate stream has a lower concentration of $CO_2$ by vol. % than the feedstream.

BRIEF DESCRIPTION OF THE DRAWINGS

FIG. 1 shows the adsorption isotherms of $CO_2$, $CH_4$, and $N_2$ in SSZ-45 at 30° C.

DETAILED DESCRIPTION

The present disclosure is directed to processes for the separation of $CO_2$ from a multi-component gas mixture containing $CO_2$ utilizing an adsorbent comprised of zeolite SSZ-45.

Zeolite SSZ-45 (or simply "SSZ-45" herein) and methods for making it are disclosed in U.S. Pat. No. 6,033,643. SSZ-45 is characterized by the presence of 8-ring channels running along the [010] direction and supercages delimited by 12-rings aligned along and off the 8-ring channels. The effective pore opening of the oval 8-ring is about 2.2 Å×3.9 Å but the cavity is about 5.6 Å in diameter and 19.8 Å long. Thus, SSZ-45 has a small pore opening that can discriminate between small molecules but a large cavity that can give the zeolite a high adsorption capacity.

Due to its hydrophobicity, highly siliceous SSZ-45 may be particularly advantageous over conventional aluminosilicate zeolites for adsorptive and membrane separations in which water is present in the gas phase. SSZ-45 can be an essentially all-silica material. As used herein, "essentially all-silica" or "essentially all silicon oxide" means that the zeolite's crystal structure is comprised of only silicon oxide, or is comprised of silicon oxide and only a trace amount of other oxides, such as aluminum oxide, which can be introduced as impurities in the source of silicon oxide used in synthesizing SSZ-45. This means that the silica to alumina (Si/Al) mole ratio of the zeolite can be infinity. In an embodiment, SSZ-45 is a highly siliceous material having a Si/Al mole ratio of at least 200 (e.g., at least 300).

Feedstream

The gas feedstream can be any multi-component gas stream containing $CO_2$. The multi-component gas feedstream can contain varying amounts of $CO_2$, CO, $CH_4$, $N_2$ and $H_2O$ as majority components and lesser amounts of sulfur- and/or nitrogen-containing compounds (e.g., $H_2S$, $SO_x$, $NH_3$, and $NO_x$) as well as other contaminants (e.g., COS). The feedstream can have a $CO_2$ content of at least 10 vol. % (e.g., at least 10 to less than 100 vol. %), at least 20 vol. % (e.g., at least 20 to less than 100 vol. %), or even at least 40 vol. % (at least 40 to less than 100 vol. %). In an embodiment, the feedstream has a total combined $CO_2$ and $CH_4$ content of at least 50 vol. % (e.g., at least 60 vol. %, at least 70 vol. %, at least 80 vol. %, at least 90 vol. %, or at least 95 vol. %). In an embodiment, the feedstream has a total combined $CO_2$ and $N_2$ content of at least 50 vol. % (e.g., at least 60 vol. %, at least 70 vol. %, at least 80 vol. %, at least 90 vol. %, or at least 95 vol. %).

The feedstream can be a flue gas, a natural gas, or an organically derived gas stream selected from a landfill produced gas and a biogenically produced gas. A "flue gas" is defined herein as a gas that is emitted from an industrial combustion operation and which is directly or indirectly emitted to the atmosphere (e.g., via a flue, stack, pipe or other channel). Flue gases generally comprise carbon dioxide and water, along with other components such as carbon monoxide, nitrogen, nitrogen oxides, and uncombusted fuel components. A "natural gas" is defined herein as a multi-component gas obtained from a crude oil well (associated gas) and/or from a subterranean gas-bearing formation (non-associated gas). A typical natural gas stream contains methane as a major component (i.e., greater than 50 mole % of the natural gas stream is methane). "Landfill produced gas streams" are defined herein as substantially gas phase streams that are produced from the substantially anaerobic degradation of organic matter in landfill disposal sites. In these landfill decomposition processes, the released gases are captured and processed for the recovery of valuable hydrocarbons which typically contain a significant concentration of methane. "Biogenically produced gas streams" are defined herein as any process that generates a methane-containing product stream from the anaerobic digestion or fermentation of biodegradable organic matter (e.g., manure, sewage, municipal waste, energy crops, etc.).

Separation Processes

In an embodiment, the selective separation of carbon dioxide from a multi-component gas feedstream can be effected by means of a membrane containing SSZ-45 or by means of a swing adsorption process, such as pressure swing adsorption (PSA) or temperature swing adsorption (TSA).

In a membrane separation process, one or more components of the gas feedstream contact one side of a membrane material and a portion of the feedstream permeates through the membrane and is retrieved from the other side of the membrane material as a "permeate" stream. In this process, the permeate stream has a higher concentration (in mole %, wt. %, or vol. % as defined by the process) of a select component (i.e., $CO_2$) than the mixed stream that initially contacts the membrane. A "retentate" stream is also obtained from the first side of the membrane which has a lower concentration (in mole %, wt. %, or vol. % as defined by the process) of a select component (i.e., $CO_2$) than the mixed stream that initially contacts the membrane. In this manner, a separation of components is made resulting in a higher value for the two separated streams (i.e., the retentate and the permeate streams) than the original mixed stream that is fed to the membrane separations process. The physical conditions on the permeate side of the membrane (e.g., pressure, temperature, and purge conditions) are chosen so that there is a gradient of chemical potential across the membrane that is favorable to drive the select component from the feed side to the permeate side of the membrane.

In one embodiment, the SSZ-45 can be incorporated into a membrane process for the selective separation of $CO_2$ from $CH_4$ in streams comprising a mixture of these components. In this embodiment, SSZ-45 is incorporated within or coated onto an inorganic substrate or a polymer material and utilized in a membrane separation process, thereby producing an "SSZ-45-containing membrane". The SSZ-45 zeolite of the membrane has a net permeation affinity for $CO_2$ over $CH_4$. The permeation rate can be typically described in terms of two multiplicative factors, one related to the diffusion rate and another related to the adsorption loadings of the components of the mixture on SSZ-45. With respect to this latter factor, SSZ-45 incorporated into the membrane which has a higher adsorptive loading ratio for $CO_2$ over $CH_4$ improves the concentration gradient for $CO_2$ either at the membrane surface (if coated onto the membrane surface) and/or in the membrane (if incorporated into the membrane matrix). This improved concentration gradient enhances the selective permeation of $CO_2$ relative to $CH_4$ through the membrane, resulting in an improved recovery of $CO_2$ in the membrane permeate stream. In another embodiment, SSZ-45 can be incorporated into a membrane process for the selective separation of $CO_2$ from $N_2$ in streams comprising a mixture of these components (e.g., a flue gas).

In one embodiment, at least one retentate stream is also obtained from the first side of the membrane which has a lower vol. % of $CO_2$ than the multi-component gas feedstream that initially contacts the membrane. In this manner, a separation of components is made resulting in a higher value for the two separated streams (i.e., the retentate and the permeate streams) than the original mixed stream that is fed to the membrane separations process. In an embodiment, the SSZ-45 zeolite utilized in the membrane process disclosed herein has selectivity for $CO_2$ over $CH_4$ of at least 10, e.g., at least 15, or at least 20. In an embodiment, the SSZ-45 zeolite utilized in the membrane process disclosed herein has selectivity for $CO_2$ over $N_2$ of at least 10, e.g., at least 15, or at least 20.

The term "selectivity" ($\alpha$) for a particular gas pair adsorbed by the particular adsorbent at given conditions of temperature and pressure is defined herein as follows:

$$\alpha = (q_1/p_1)/(q_2/p_2)$$

wherein $q_1$ is the number of moles of gas 1 adsorbed at partial pressure $p_1$; and $q_2$ is the number of moles of gas 2 adsorbed at partial pressure $p_2$.

The membranes utilized herein can be asymmetric and can be comprised of several layers of different materials. To improve the mass transfer characteristics of these asymmetric membrane structures one or more of these layers can be a porous material. A thin selective layer imparts most of the molecular selectivity in the asymmetric membrane structure and in a preferred embodiment this selective layer contains SSZ-45. On the feed side, molecules are selectively adsorbed in the selective layer and on the permeate side the molecules are desorbed. The selective SSZ-45-containing layer can optionally include other materials. One of the materials that can be present in the zeolite-containing layer is a polymer. When the SSZ-45-containing layer contains more than 10 vol. % of another material, the selective layer is called a mixed matrix. To mitigate the effect of any defects or pinholes in the selective layer, a reparation coating or reparation layer can be incorporated in the membrane structure.

In a swing adsorption process, there is at least one adsorption step wherein a multi-component gas feedstream is contacted with the adsorbent material. During this step of the process, the multi-component gas feedstream contacts the adsorbent material under certain process temperature and pressure conditions and as the multi-component gas feedstream flows through the adsorbent material at least a portion of the "first component" (i.e., $CO_2$) of the multi-component gas stream is preferentially adsorbed by the adsorbent material with respect to a "second component" (e.g., $CH_4$ or $N_2$). During this step an "effluent stream" (or "$CO_2$-lean product stream" herein) is drawn from the swing adsorption process wherein the total number of moles of the first component into the swing adsorption process is higher than the total number of moles of the first component out of the swing adsorption process during this adsorption step. Although it is not necessary, it is preferred that the mole concentration of the first component in the multi-component gas stream be greater than the mole concentration of the first component in the effluent stream.

The swing adsorption process is typically also comprised of at least one desorption step wherein at least a portion of the first component that has been preferentially adsorbed by the adsorbent material is recovered in what is termed herein as a "desorbed stream" (or "$CO_2$-rich product stream" herein). During this step, the process conditions in the swing adsorption process are changed to allow at least a portion of the first component (i.e., $CO_2$) to be desorbed from the adsorbent material and collected as a "desorbed stream". This desorption can be induced by a pressure swing, a temperature swing, the introduction of a partial pressure purge displacement stream, or a combination thereof. In a preferred embodiment, the mole concentration of the first component in the desorbed stream is greater than the mole concentration of the first component in the multi-component gas feedstream. In another preferred embodiment, the mole concentration of the first component in the desorbed stream is greater than the mole concentration of the first component in the effluent stream. In an embodiment, the $CO_2$-rich product stream comprises at least 50 vol. % of $CO_2$ (e.g., at least 60 vol. %, at least 70 vol. %, at least 80 vol. %, or at least 90 vol. % of $CO_2$).

One embodiment of the swing adsorption process of the present disclosure utilizes a PSA process wherein the adsorbent material is comprised of SSZ-45 and the "first component" as described above is $CO_2$ and the "second component" as described above is $CH_4$. In another embodiment, the "first component" as described above is $CO_2$ and the "second component" as described above is $N_2$. In this PSA process, the partial pressure of the first component in the adsorption step is higher than the partial pressure of the first component in the desorption step which allows at least a portion of the adsorbed first component to be recovered in the desorption step and the adsorbent material to be regenerated by depletion of the adsorbed components for reuse in a subsequent adsorption step. This is accomplished in part by exposing the adsorbent material to lower partial pressure conditions in the desorption step than the partial pressure conditions in the adsorption step. This desorption can be further assisted by utilizing a purge gas to lower the partial pressure of the first component during the desorption step, a purge step, a partial pressurization step, or a partial depressurization step.

Another type of swing adsorption process of the present disclosure is a TSA process wherein the adsorbent material is comprised of SSZ-45 and the "first component" as described above is $CO_2$ and the "second component" as described above is $CH_4$. In another embodiment, the "first component" as described above is $CO_2$ and the "second component" as described above is $N_2$. The TSA processes operate similar to the PSA processes above wherein the partial pressure of the first component in the adsorption step is higher than the partial pressure of the first component in the desorption step which allows at least a portion of the adsorbed first component to be recovered in the desorption step and the adsorbent material to be regenerated by depletion of the adsorbed components for reuse in a subsequent adsorption step. However, in the TSA processes, this is accomplished in part by exposing the adsorbent material to higher temperature conditions in the desorption step than the temperature conditions in the adsorption step. This desorption can be further assisted by utilizing a purge gas to lower the partial pressure of the first component and/or provide heating of the adsorbent material during the desorption step, a purge step, a partial pressurization step, or a partial depressurization step.

In embodiments, the SSZ-45 zeolite utilized in a swing adsorption process has selectivity for $CO_2$ over $CH_4$ of at least 10, e.g., at least 15, or at least 20. In embodiments, the SSZ-45 zeolite utilized in a swing adsorption process has selectivity for $CO_2$ over $N_2$ of at least 10, e.g., at least 15, or at least 20.

It should also be noted that the steps of the PSA and TSA processes can be combined in a PSA/TSA process. In these combined processes, both pressure and temperature changes or "swings" are made between the adsorption steps and desorption steps of the process, resulting in a desired separation of at least a portion of the first component from the second component of the multi-component gas feedstream fed to the inlet of the PSA/TSA process.

It can be desirable to recover separated $CO_2$ at higher pressure. The recovery of $CO_2$ can be desirable, for example, when $CO_2$ sequestration is planned. In these cases, adsorption by temperature swing (TSA) can be preferred over pressure swing (PSA). The term "sequestration" is defined herein as the confinement of a waste stream containing at least 50 vol. % of $CO_2$ in an underground structure, or repository, or in the deep ocean at pressures of at least 500 psig (3.45 MPa).

In embodiments of the swing adsorption processes of the present disclosure, SSZ-45 can be incorporated into the adsorption swing process in many structural forms and/or in combination with additional components. SSZ-45 can be incorporated as crystallites of preferred size and shape of substantially uniform dimensions or with dimensions suitably distributed according to a preferred distribution. The crystallites can be used directly as produced in the synthesis steps or be formulated into larger aggregates or incorporated into a structured or matrix material to provide form, stability, and/or in combination with other complementary co-adsorbent materials that can fulfill a variety of other beneficial functions to the overall process. Non-limiting examples include incorporating SSZ-45 with a binder material to form a matrix comprising a binder material selected from a crystalline polymer, a non-crystalline polymer, an epoxy, a thermoplastic, a clay, a silica-containing material, an alumina-containing material, and a titania-containing material. The binder material can also exhibit either a microporous or a mesoporous structure. Additionally, it can be advantageous to add suitably chosen additives into this binder material. These additives can be used to improve the adsorption/desorption and transport properties of the selected components within the SSZ-45 zeolite.

When SSZ-45 is incorporated with a binder, the adsorbent material can be formulated into optimal geometric shapes or be applied onto supporting substrates which further improve the durability of the adsorbent and the rate at which the selected adsorbing components are brought into contact with the adsorption sites of SSZ-45. Non-limiting examples include beads, extrudates, formed pellets, structured beds, monoliths and hollow fibers, as well as coatings applied to plates or monolithic structures fibers or hollow fibers.

Suitable adsorption conditions can include a temperature of from 0° C. to 50° C. and a pressure of from 10 to 100 bar (1 to 10 MPa), e.g. from 10 to 50 bar (1 to 5 MPa), from 30 to 100 bar (3 to 10 MPa), or from 30 to 50 bar (3 to 5 MPa).

In embodiments, the $CO_2$-lean stream produced in the processes described herein for the removal of $CO_2$ can contain less than 5 vol. % $CO_2$ (e.g., less than 3 vol. % $CO_2$).

EXAMPLES

The following illustrative examples are intended to be non-limiting.

Example 1

Synthesis of SSZ-45

3 mmol of N-cyclopentyl 1,4-diazabicyclo[2.2.2]octane hydroxide (prepared as described in Example 1 of U.S. Pat. No. 6,033,643), 0.75 g of 1 N KOH and 6 mL of water were added to the Teflon cup of a 23 mL Parr 4745 reactor to yield a clear, basic solution. Silica was then supplied to the reaction mixture by adding 0.92 g of a highly dealuminated FAU framework type zeolite (TOSOH 390HUA, $SiO_2/Al_2O_3$ mole ratio=500). The mixture was sealed and heated at 160° C. for two weeks in an oven equipped with a rotating spit operating at 43 rpm. The autoclave was then removed and allowed to cool to room temperature. The solids were recovered by filtration, washed thoroughly with deionized water and dried.

The resulting product was analyzed by powder X-ray diffraction and shown to be SSZ-45. The product had a silica to alumina mole ratio of greater than 300. Scanning electron micrographs of the resulting product showed crystallites with platelet morphology.

Example 2

Calcination of SSZ-45

The product of Example 1 was calcined in a muffle furnace under a flow of air heated at 595° C. at a rate of 1° C./min and held at 595° C. for five hours, cooled and then analyzed by powder XRD. Powder XRD confirmed the product as SSZ-45.

Example 3

Adsorption experiments with $CO_2$, $CH_4$, and $N_2$ were done at 30° C. on a volumetric gas adsorption system, SETARAM PCTPro-200 instrument. This instrument was equipped with a low and high-pressure transducer for measurement between 0.001-60 bar total pressure. SSZ-45 samples prepared according to Example 2 were activated by heating to 250° C. under vacuum for 8 hours.

FIG. 1 shows the adsorption isotherms for $CO_2$, $CH_4$, and $N_2$ in SSZ-45 at 30° C. At low partial pressures, there is no steep uptake of $CO_2$ due to the high Si/Al mole ratio of the SSZ-45 (Si/Al mole ratio>300). This behavior has also been observed in other high-silica small pore zeolites (e.g., silicalite-1, LTA zeolites). Surprisingly, when the pressure is increased to 30 bar or more, where the $CO_2$ uptake is nearly saturated in other small pore zeolites (e.g., SSZ-13), the $CO_2$ uptake in SSZ-45 continues to increase and the uptake curve becomes even steeper.

Example 4

Ideal Adsorbed Solution Theory (IAST) is a thermodynamic method for predicting the adsorption behavior of a material for gas mixture and has been applied successfully to $CO_2$ adsorption in zeolites (see, e.g., J. A. Dunne et al., *Langmuir* 1997, 13, 4333-4341). IAST was used to assess the expected multi-component adsorption behavior of SSZ-45 for three different gas compositions relevant for flue gas separations ($CO_2/N_2$) and for biogas and natural gas separations ($CO_2/CH_4$). The results are set forth in Table 1.

TABLE 1

IAST Calculations for SSZ-45 with Different Gas Mixtures Containing $CO_2$, $CH_4$, and $N_2$ at 30° C.

| Gas Mixture | Pressure (bar) | Gas 1 (Mole Fraction) | Gas 2 (Mole Fraction) | Selectivity |
|---|---|---|---|---|
| $CO_2(1)/N_2(2)$ | 1.0 | 0.15 | 0.85 | 24.3 |
| $CO_2(1)/CH_4(2)$ | 10.0 | 0.50 | 0.50 | 24.1 |
| $CO_2(1)/CH_4(2)$ | 40.0 | 0.10 | 0.90 | 24.2 |

The $CO_2/CH_4$ adsorption selectivities for SSZ-45 reported herein show about a 3.5-fold improved $CO_2/CH_4$ adsorption selectivity over that previously reported for an all-silica DDR-type zeolite (S. Himeno et al., *Micropor. Mesopor. Mater.* 2007, 98, 62-69). The $CO_2/N_2$ adsorption selectivity for SSZ-45 reported herein shows comparable $CO_2/N_2$ adsorption with that previously reported for an all-silica DDR-type zeolite (J. van den Bergh et al., *J. Membr. Sci.* 2008, 316, 35-45). Without wishing to be bound by any theory, the results of these calculations suggest that the small aperture and large cavity of SSZ-45 may result in adsorption or membrane separation properties for $CO_2/CH_4$ that are superior to conventional high-silica zeolites such as siliceous DDR- and MFI-type zeolites.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A process for selectively separating carbon dioxide ($CO_2$) from a multi-component gas feedstream comprising $CO_2$, the process comprising:
   (a) contacting a first side of a membrane comprised of zeolite SSZ-45 with the feedstream at a first pressure and first temperature;
   (b) retrieving a first permeate stream from a second side of the membrane at a second pressure and second temperature, wherein the first permeate stream consists of components that selectively permeate through the membrane and the first permeate stream has a higher concentration of $CO_2$ by vol. % than the feedstream; and
   (c) retrieving a first retentate stream, wherein the retentate stream has a lower concentration of $CO_2$ by vol. % than the feedstream.

2. The process of claim 1, wherein the feedstream has a $CO_2$ content of at least 10 vol. %.

3. The process of claim 1, wherein the feedstream further comprises $CH_4$ and has a total combined $CO_2$ and $CH_4$ content of at least 50 vol. %.

4. The process of claim 1, wherein the feedstream further comprises $N_2$ and has a total combined $CO_2$ and $N_2$ content of at least 50 vol. %.

5. The process of claim 1, wherein the feedstream is a flue gas, a natural gas, or an organically derived gas stream selected from a landfill produced gas and a biogenically produced gas.

6. The process of claim 1, wherein the zeolite has a silica to alumina mole ratio of at least 200.

* * * * *